(12) United States Patent
Kim et al.

(10) Patent No.: US 10,942,859 B2
(45) Date of Patent: Mar. 9, 2021

(54) COMPUTING SYSTEM AND METHOD USING BIT COUNTER

(71) Applicants: SK hynix Inc., Icheon (KR); Korea University Industry Cooperation Foundation, Seoul (KR)

(72) Inventors: Seonwook Kim, Icheon (KR); Wonjun Lee, Icheon (KR); Yoonah Paik, Icheon (KR); Jaeyung Jun, Icheon (KR)

(73) Assignees: SK hynix Inc., Icheon (KR); Korea University Industry Cooperation Foundation, Seoul (KR)

( * ) Notice: Subject to any disclaimer, the term of this patent is extended or adjusted under 35 U.S.C. 154(b) by 44 days.

(21) Appl. No.: 16/265,796

(22) Filed: Feb. 1, 2019

(65) Prior Publication Data

US 2020/0142836 A1    May 7, 2020

(30) Foreign Application Priority Data

Nov. 7, 2018   (KR) .......................... 10-2018-0135546

(51) Int. Cl.
*G06F 12/0886*     (2016.01)
*G06F 12/0891*     (2016.01)

(52) U.S. Cl.
CPC ...... *G06F 12/0886* (2013.01); *G06F 12/0891* (2013.01); *G06F 2212/1021* (2013.01)

(58) Field of Classification Search
None
See application file for complete search history.

(56) References Cited

U.S. PATENT DOCUMENTS

| | | | |
|---|---|---|---|
| 5,515,522 A * | 5/1996 | Bridges | G06F 12/0835 711/118 |
| 9,092,337 B2 | 7/2015 | Nellans et al. | |
| 9,529,730 B2 | 12/2016 | Sadoughi-Yarandi et al. | |
| 9,886,395 B2 | 2/2018 | Brandt et al. | |
| 2011/0283040 A1 * | 11/2011 | Chadha | G06F 12/1027 711/3 |
| 2016/0147669 A1 * | 5/2016 | Huang | G06F 12/082 711/128 |

* cited by examiner

*Primary Examiner* — Denise Tran

(57) ABSTRACT

A computing system using a bit counter may include a host device; a cache configured to temporarily store data of the host device, and including a plurality of sets; a cache controller configured to receive a multi-bit cache address from the host device, perform computation on the cache address using a plurality of bit counters, and determine a hash function of the cache; a semiconductor device; and a memory controller configured to receive the cache address from the cache controller, and map the cache address to a semiconductor device address.

10 Claims, 6 Drawing Sheets

COMPUTING SYSTEM AND METHOD USING BIT COUNTER

CROSS-REFERENCE TO RELATED APPLICATION

This application claims priority under 35 U.S.C. § 119 to Korean Patent Application No. 10-2018-0135546, filed on Nov. 7, 2018, which is incorporated herein by reference in its entirety.

BACKGROUND

1. Field

Embodiments relate to a computing system and method using a bit count, and more particularly, to a computing system and method using a bit counter, which can determine an index bit for use in a cache by hashing an address based on a bit counter technique, and thus not only prevent a cache conflict miss caused by accesses being concentrated in a plurality of memory regions having a same value for certain address bits, thereby reducing the number of accesses to a semiconductor device, and also preventing consecutive accesses to the same bank of the semiconductor device such that bank conflicts of the semiconductor device can be reduced.

2. Discussion of the Related Art

A computing system includes a cache installed between a CPU and a semiconductor device, and the CPU processes a read/write request for the semiconductor device through the cache. In the cache, however, the read/write request frequently causes a semiconductor device request due to a conflict miss.

The cache includes a plurality of identifiable sets selected according to index bits of an address of the read/write request, each of the sets includes a plurality of identifiable blocks, and each of the blocks includes a respective tag to identify the block. The tag is used to store one or more bits of an address of the data stored in the block.

The conflict miss indicates that accesses to the cache are concentrated on some sets within the cache such that data having the same index bit are evicted while the number of cache misses for the corresponding sets is increased.

In this case, not only the read/write processing time may be delayed by the increased number of the cache misses caused by conflict misses, but also a memory delay may be significantly increased by consecutive requests to the same bank of the semiconductor device, thereby degrading the performance of the entire system.

SUMMARY

Various embodiments are directed to a computing system and method using a bit counter, which can determine an index bit by hashing an address based on a bit counter, and thus not only prevent a cache conflict miss caused by accesses being concentrated on some sets such that the number of accesses to a semiconductor device can be reduced, but also prevent consecutive accesses to the same bank of the semiconductor device such that bank conflicts of the semiconductor device can be reduced.

In an embodiment, a computing system using a bit counter may include: a host device; a cache configured to temporarily store data of the host device, and including a plurality of sets; a cache controller configured to receive a multi-bit cache address from the host device, compute the cache address using a plurality of bit counter units, and determine a hash function of the cache; a semiconductor device; and a memory controller configured to receive the cache address from the cache controller, and map the cache address to a semiconductor device address.

In an embodiment, a computing system using a bit counter may include: a host device; a cache configured to temporarily store data of the host device, and including a plurality of sets; a semiconductor device; and a cache controller configured to receive a multi-bit cache address from the host device, determine a hash function of the cache by computing the cache address using a plurality of bit counter units, and map the cache address to a semiconductor device address.

In an embodiment, a computing method using a bit counter may include: resetting, by a cache controller, a bit counter unit; adding, by the cache controller, an input address bit to a count value within the bit counter unit; storing, by the cache controller, the added count value within the bit counter unit; determining whether the adding of the input address bit and the storing of the count value are repeated for a predetermined number of times; and determining a hash function to apply to a next interval, and flushing data within the cache to a semiconductor device, after the determining of whether the adding of the input address bits and the storing of the count value are repeated by the predetermined number of times.

DETAILED DESCRIPTION

Figure 1:
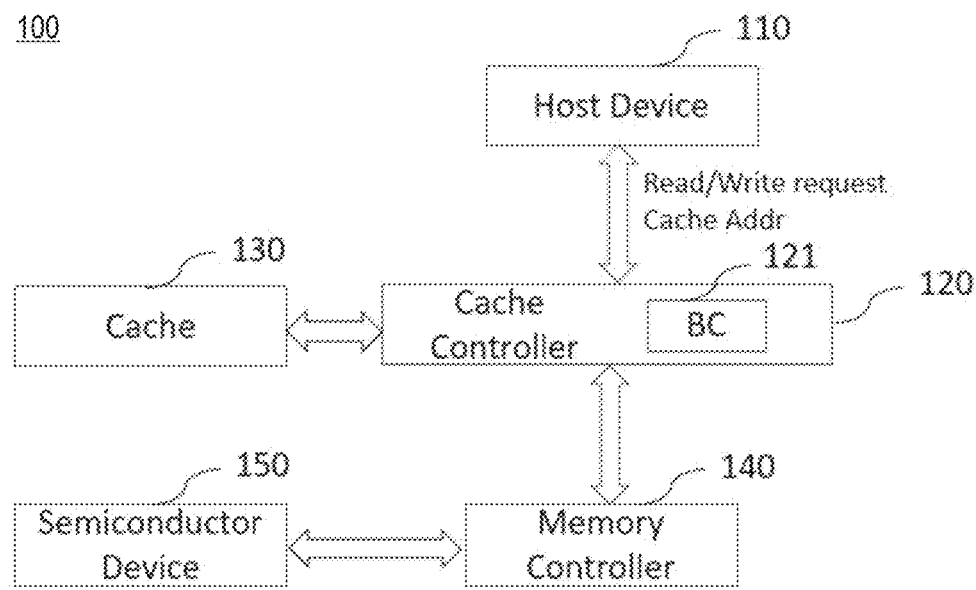
FIG. 1 is a block diagram of a computing system using a bit counter in accordance with an embodiment.

The advantages and characteristics of the present disclosure and a method for achieving the advantages and characteristics will be described through the following embodiments with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art to which the present disclosure pertains, and the present disclosure is only defined by the scope of claims.

The terms used in this specification are used to describe exemplary embodiments, and do not limit the present disclosure. In this specification, the terms of a singular form may include plural forms unless referred to the contrary. The meaning of "comprise" and/or "comprising" used in this specification specifies a component, step, operation and/or element, but does not exclude one or more other components, steps, operations and/or elements.

When one element is referred to as being "connected to" or "coupled to" another element, it may indicate that the former element is directly connected or coupled to the latter element or another element is interposed therebetween. On the other hand, when one element is referred to as being "directly connected to" or "directly coupled to" another element, it may indicate that no element is interposed therebetween. Furthermore, "and/or" include each of described items and one or more combinations thereof.

Throughout the specification, like reference numerals denote the same components. Therefore, although like or similar reference numerals are not mentioned or described in a corresponding drawing, the reference numerals may be described with reference to other drawings. Furthermore, although no reference numerals are attached to some components, the components may be described with reference to other drawings.

In embodiments, cache eviction indicates an operation of evicting existing block data stored in a cache to a semiconductor device, in response to a specific set of the cache having no more space to store data.

Furthermore, flush or flushing indicates an operation of writing data of the cache into the semiconductor device, and resetting the cache. That is, flushing the cache evicts all the existing block data stored in the cache to the semiconductor device, after which no block data is stored in the cache.

FIG. 1 is a block diagram of a computing system 100 using a bit counter in accordance with an embodiment.

The computing system 100 using a bit counter in accordance with the present embodiment includes a host device 110, a cache controller 120, a cache 130, a memory controller 140 and a semiconductor device 150.

The host device 110 may include a host, a server, a storage controller of a storage area network (SAN), a work station, a personal computer, a laptop computer, a handheld computer, a super computer, a computer cluster, a network switch, a router or application device, a database or storage application device, a data acquisition or data capture system, a diagnosis system, a test system, a robot, a portable electronic device, a wireless device and the like. The host device 110 may include one or more Central Processor Units (CPUs) or the like.

In accordance with an embodiment, the host device 110 may communicate with the cache controller 120. The cache controller 120 may receive a read/write request and a cache address Cache Addr for the read/write request from the host device 110, determine a cache index and a tag according to the cache address Cache Addr using a bit counter unit (BC) 121, cache data into the cache 130 from the host device 110, the semiconductor device 150, or both, and evict the cached data from the cache 130 to the semiconductor device 150 through communication with the memory controller 140. Evicting of the data from the cache 130 to the semiconductor device 150 includes storing data stored at a predetermined cache address Cache Addr of the cache 130 into a semiconductor device address Semi Addr within the semiconductor device 150, mapped to the cache address Cache Addr, and deleting the data stored at the cache address Cache Addr. In general, the storage capacity of the cache 130 is much smaller than the storage capacity of the semiconductor device 150, and the same addresses as a plurality of addresses within the cache 130 are present in some areas of the semiconductor device 150.

In accordance with the present embodiment, the cache controller 120, the cache 130, the memory controller 140 and the semiconductor device 150 may be implemented as one module. The semiconductor device 150 may include a DRAM.

Figure 2:
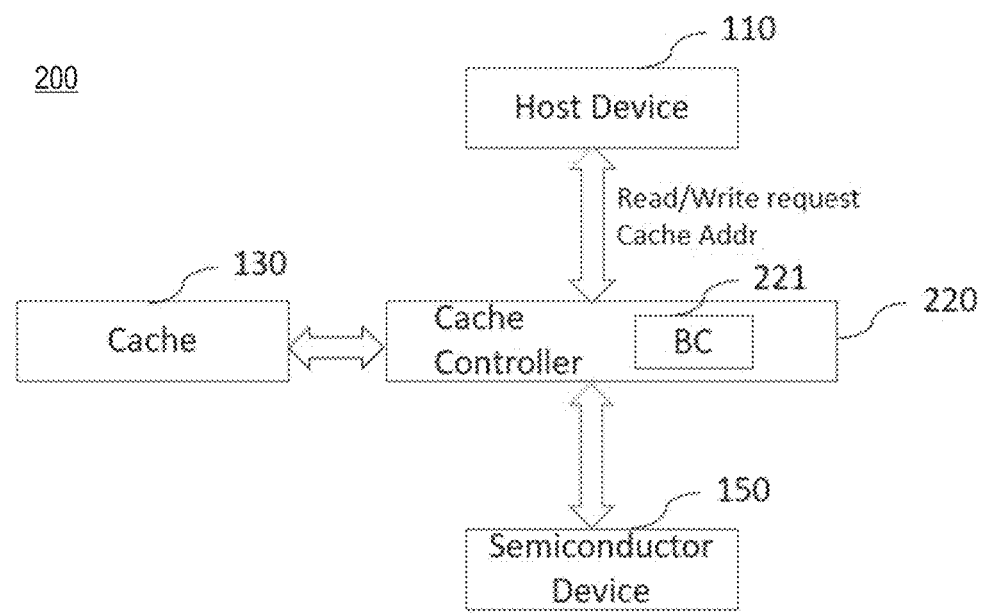
FIG. 2 is a block diagram of a computing system using a bit counter in accordance with another embodiment.

FIG. 2 is a block diagram of a computing system 200 using a bit counter in accordance with another embodiment.

In accordance with the present embodiment, a bit counter unit 221 may be implemented in a cache controller 220.

In accordance with the present embodiment, the host device 110 may communicate with the cache controller 220. The cache controller 220 may receive a read/write request and a cache address Cache Addr from the host device 110, determine a cache index and a tag according to the cache address Cache Addr received from the host device 110 using the bit counter unit 221, cache data from the host device 110, the semiconductor device 150, or both in the cache 130, and evict the cached data from the cache 130 to the semiconductor device 150.

In accordance with an embodiment, the cache 130 and the semiconductor device 150 may be implemented as one module.

In accordance with another embodiment, the cache 130, the cache controller 120 and the semiconductor device 150 may be implemented as one module. The semiconductor device 150 may include a DRAM.

Figure 3A:
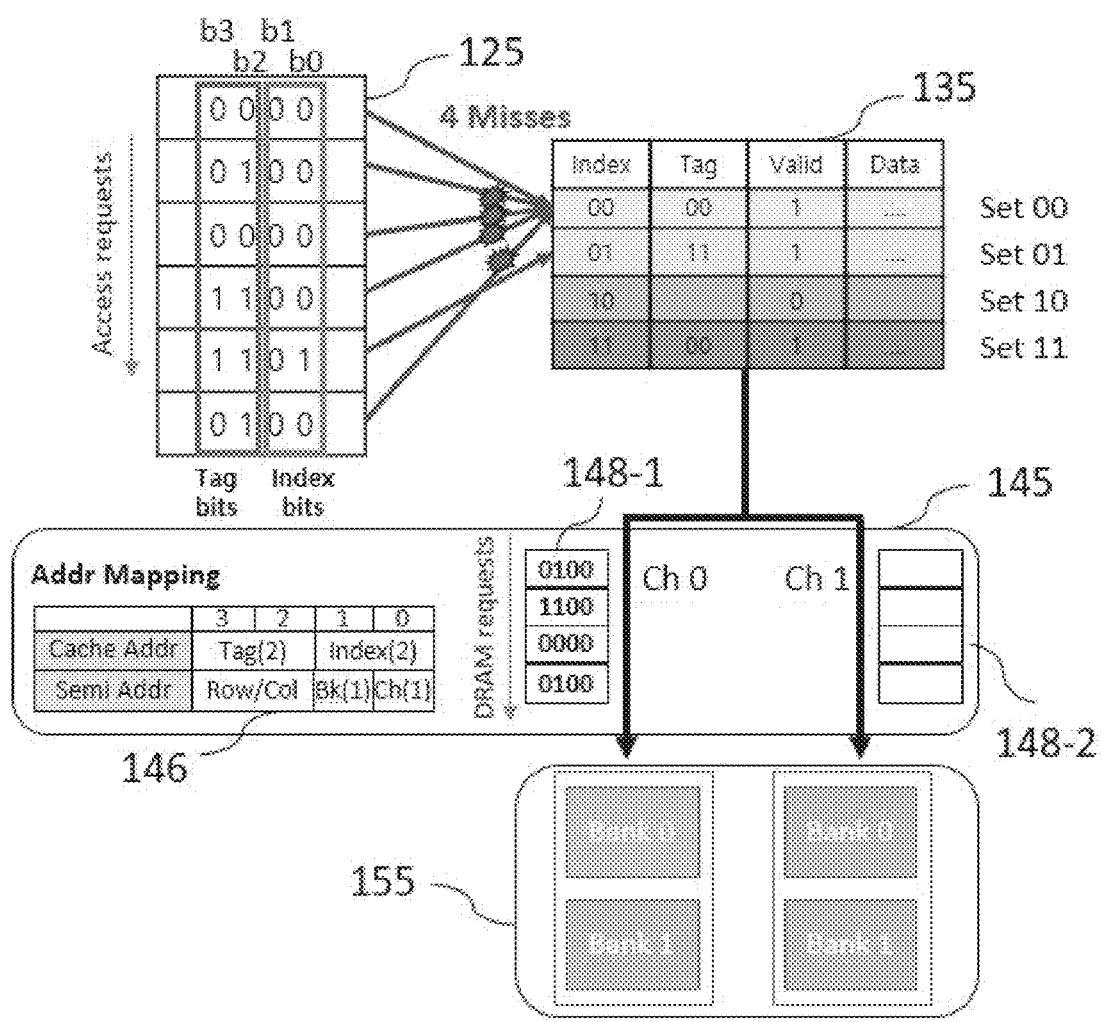
FIGS. 3A and 3B illustrate request miss distributions before and after bit counters are applied to a cache in accordance with the present embodiment.
Figure 3B:
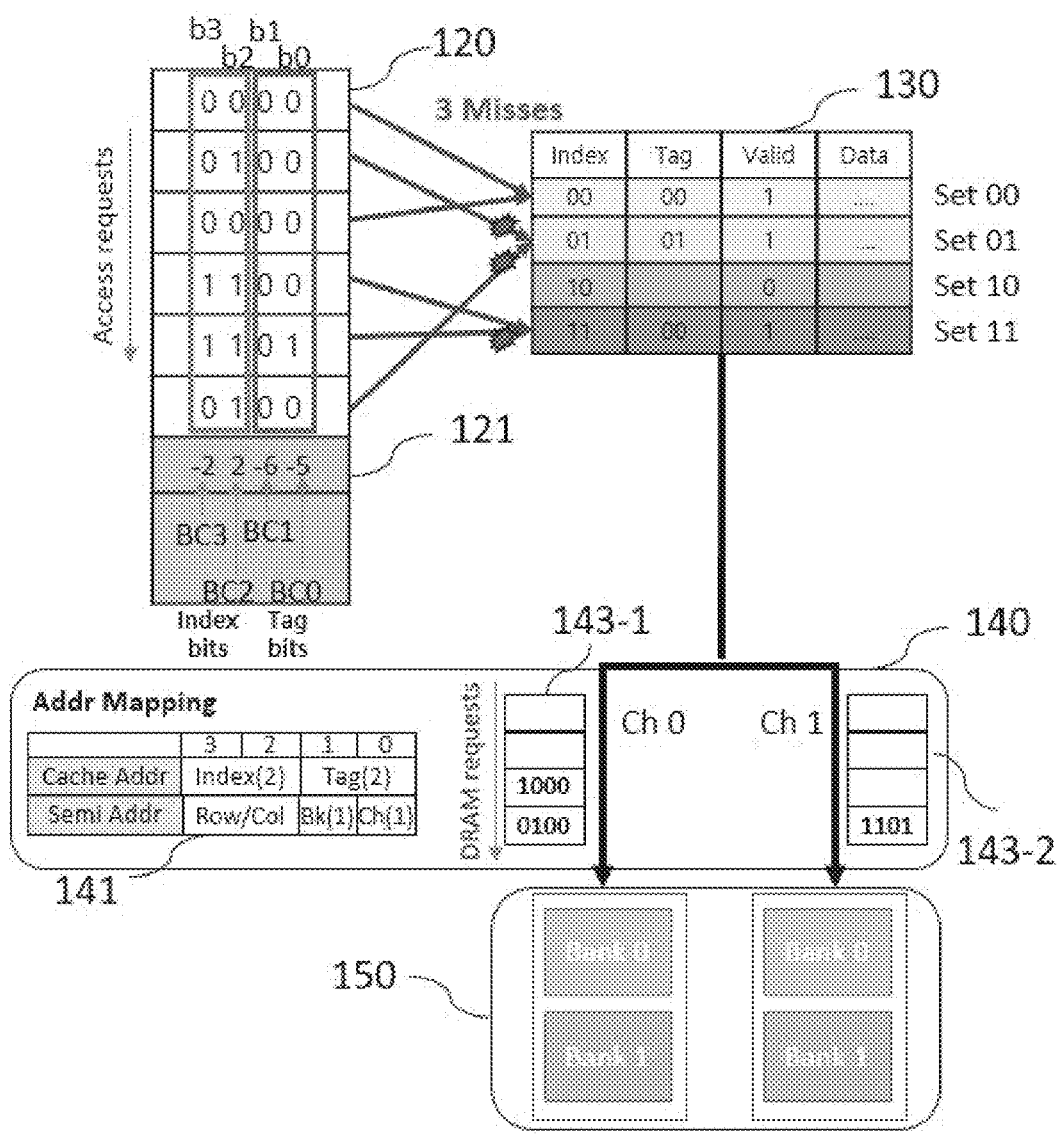

FIG. 3A illustrates a request miss distribution before the bit counter is used in the cache, and FIG. 3B illustrates a cache miss distribution after the bit counter is used in the cache in accordance with the present embodiment. In FIG. 3A, bits b0, b1, b2, and b3 indicate four predetermined bits in a cache address corresponding to a read/write request, but may be any four predetermined bits of the cache address; that is, bits b0 to b4 are not necessarily the least significant bits of the cache address. In embodiments, bits b0 to b3 may be consecutive.

For example, FIG. 3A illustrating the request miss distribution before the bit counter is not applied to a cache 135 shows that accesses are concentrated on a specific set when access requests are processed with index bits fixed to a lower two bits (b1, b0). That is, five accesses of the entire six accesses have index bits equal to 00 and are therefore concentrated on a set set00. Thus, four request misses occur to cause four requests for the semiconductor device. At this time, the cache requests having caused the semiconductor device requests (Semi requests) have the same index, and the index bits of the cache requests are mapped to the channel and bank of the Semi request. Therefore, all of the four Semi requests occur in the same bank of the same channel.

A memory controller 145 writes data to a predetermined bank within the semiconductor device or reads data from the predetermined bank by mapping a cache address Cache Addr to a semiconductor device address Semi Addr. That is, the memory controller 145 maps a first bit b0 of the cache address Cache Addr to a channel of the semiconductor device, and maps a second bit b1 of the cache address Cache Addr to a bank of the semiconductor device. For example, the memory controller 145 maps the first bit b0 to a first channel Ch0 within the semiconductor device because the first bit b0 of the index bits within the cache address Cache Addr is "0", maps the second bit b1 to a first bank Bank0 within the first channel ch0 because the second bit b1 of the index bits within the cache address Cache Addr is "0", and maps tag bits of third and four bits b2 and b3 to the corresponding row/column of the first bank Bank0 within the first channel ch0.

As illustrated in FIG. 3B, however, when the bit counter is used in the cache in accordance with the present embodiment, the access concentration for each set may be reduced even in the case that the same sequence of cache addresses Cache Addr is inputted according to access requests.

In accordance with the present embodiment, the cache 130 may include four sets set00, set01, set10 and set11, each of the sets may include a plurality of blocks block0 to block3, the blocks may have their tags Tag0, Tag1, . . . , and data Data0, Data1, having a predetermined size may be stored in association with their respective tags. In FIG. 3B, the second to fourth blocks block1 to block3 are omitted.

When the cache controller 120 receives read/write requests and cache addresses Cache Addr each including bits b3, b2, b1 and b0 for the read/write requests from the host device 110, each of four bit counters BC0 to BC3 in the bit counter unit 121 within the cache controller 120 is respectively updated according to the corresponding bit of bits b0 to b3 for a predetermined number of sequentially received cache addresses Cache Addr. During this time, a previously determined two bits of bits b0 to b3 of the cache addresses Cache Addr may be used as an index, and the other two bits of bits b0 to b3 may be used as a tag.

In the example, since the received cache address Cache Addr has four bits that are used for the index and tag, the four bit counters BC0 to BC3 are used. When the predetermined number of sequentially received cache addresses Cache Addr used by bit counter unit 121 for the computation is $2^{10}$ (that is, 1024), each of the bit counters BC0 to BC3 may be 10 bit counters. One of the bits of the 10 bit counters may be used for sign indication, and the other nine bits of the bit counters may be used for bit counting. However, embodiments are not limited thereto; in an embodiment having a total of N cache address bits used for tag and index bits, the bit counter unit 121 includes a counter for each of the N bits, and when the predetermined number of sequentially received cache addresses Cache Addr used in the computation is $2^x$, each of the counter includes at least X bits.

After the predetermined number of cache addresses Cache Addr are received, the cache controller 120 generates the absolute values of the values of each of the bit counters BC0 to BC3 of bit counter unit 121, creates a combination of the bits b0 to b3 according to the two smallest absolute values, and creates a hash function to use the combination as the index bits of the cache. For example, in FIG. 3b, bit counters BC2 and BC3 have the smallest absolute values, and as a result bits b2 and b3 are combined to create the index bits.

The hash function indicates a factor required for the cache controller 120 to find index bits using a read/write request and a cache address Cache Addr which are received from the host 110. The reason to generate the absolute values will be described with reference to FIG. 4.

When the bit counter BC0 to BC3 for the cache addresses Cache Addr are computed for the predetermined number of cache addresses and the hash function is selected to use the combination according to the two smallest values among the computed absolute values of the bit counters BC0 to BC3 as an index, the hash function is based on the bits among b0 to b3 having the most equal distributions of "0's" and "1's" for the predetermined number of cache addresses. For example, when the predetermined number is 1024, the bit counter BC2 having a value of 2 may indicate that bit b2 was a '1' 513 times and a '0' 511 times, while the bit counter BC3 having a value of −2 may indicate that bit b3 was a '1' 511 times and a '0' 513 times. Therefore, by basing the index on the bits having the most equal distribution of "0's" and "1's", the sets within the cache can be uniformly used.

For example, in the example shown in FIG. 3b, the cache controller 120 takes the absolute values of "−2", "2", "−6" and "−5" which are the values computed by the first to fourth bit counters BC0 to BC3 corresponding to the respective bits. In this case, two bits having the smallest absolute values are the third and fourth bits b2 and b3.

Therefore, the cache controller 120 selects a bit combination (b2, b3) as the hash function. At this time, the cache controller 120 uses the third and fourth bits b2 and b3 as index bits, and uses the first and second bits b0 and b1 as tag bits.

When the cache address "0000" of a first access request is inputted to the cache controller 120, the cache controller 120 controls the cache 130 to process the corresponding request because the index bits 00 and the tag bits 00 coincide with those of the set set00.

However, when the cache address "0100" of a second access request is inputted to the cache controller 120, the cache 130 cannot process the corresponding access request, because the index bits 01 coincide with the index bits 01 of the set set01, but the tag bits 00 do not coincides with the tag bit 01 of the set set01. At this time, the cache controller 120 outputs the second access request as a Semi request to the memory controller 140, and the memory controller 140 maps the cache address Cache Addr to a semiconductor device address Semi Addr using the mapping scheduler 141, and processes a first Semi request inputted to transaction queues 143-1 and 143-2. That is, when the cache address Cache Addr "0100" of the first Semi request is inputted to the transaction queues 143-1 and 143-2, the memory controller 140 maps the first bit b0 "0" to the first channel Ch0, maps the second bit b1 "0" to the first bank Bank0 within the first channel, and maps the third and four bits b2 and b3 to the corresponding row/column of the first bank Bank0 within the first channel, using the mapping scheduler 141. Then, the memory controller 140 processes the first Semi request.

Since third to sixth access requests inputted to the cache controller 120 are processed in the same manner, the detailed descriptions thereof will be omitted herein.

When the first to sixth access requests are processed in such a manner, accesses for the respective sets may be distributed such that two accesses are made to the set set00, two accesses are made to the set set01, and two accesses are made to the set set11. In this case, since three conflict misses occur, the number of requests transferred to the semiconductor device is also reduced to three. At this time, although the addresses having generated the Semi requests have the same cache index, Semi requests generated in the same set may be mapped to different channels and banks, because the index bits of the addresses are not mapped to the channels and banks of the Semi requests.

Figure 4:
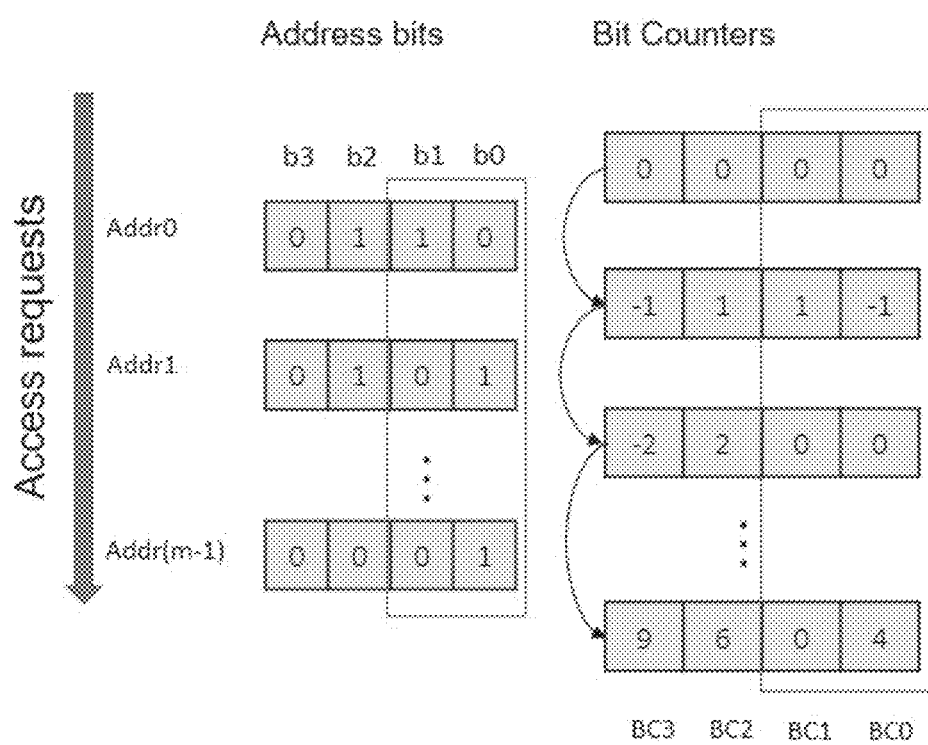
FIG. 4 illustrates value changes of bit counters for address bits within the cache when an access request is processed in accordance with an embodiment.

FIG. 4 is a diagram for describing values changes of the bit counters when an access request for an address within the cache in accordance with the present embodiment is processed.

In accordance with the present embodiment, a method for performing computation on each cache address Cache Addr includes incrementing a bit counter value by 1 when the corresponding bit in the cache address Cache Addr is "1", and decrementing the bit counter value by 1 when the corresponding bit in the cache address Cache Addr is "0".

Suppose that the values of the fourth to first bit counters BC3 to BC0 are stored as "0 0 0 0" at the initial stage. Then, when a first address Addr0 of "0 1 1 0" is inputted, the fourth to first bit counters BC3 to BC0 compute the counter values as "−1 1 1−1" through the cache address computing method in accordance with the present embodiment. That is, bit counter BC0 decreases by 1 in response to bit b0 being 0, bit counter BC1 increases by 1 in response to bit b1 being 1, bit counter BC2 increases by 1 in response to bit b2 being 1, and bit counter BC3 decreases by 1 in response to bit b3 being 0.

Then, when a second address Addr1 having values for b3 to b0 of "0 1 0 1" is inputted, the fourth to first bit counters BC3 to BC0 are respectively decremented by 1, incremented by 1, decremented by 1, and incremented by 1 to compute the counter values as "−2 2 0 0".

In this way, when an $m^{th}$ address Addr(m−1) of "0 0 0 1" is inputted, the fourth to first bit counters BC3 to BC0 compute the counter values as "9 6 0 4".

The cache controller 120 takes the absolute values of the computed values of the four bit counters, creates six bit combinations using the four absolute values (i.e., combinations {|BC3|,|BC2|}, {|BC3|,|BC1|}, {|BC3|,|BC0|}, {|BC2|,|BC1|}, {|BC2|,|BC0|}, {|BC1|,|BC0|}, where |BCn| is the absolute value of bit counter BCn), adds the absolute values of the individual bit counters together for each of the six bit combinations (producing sums |BC3|+|BC2|=15, |BC3|+|BC1|=9, |BC3|+BC0|=13, |BC2|+BC1|=6, |BC2|+|BC0|=10, and |BC1|+|BC0|=4), and selects the bit combination (in FIG. 4, the combination (b1, b0) since |BC1|+|BC0|=4) having the smallest sum of absolute values. As a result, the cache controller 120 selects a hash function to use the bit combination (b1, b0) as the index bits of the cache.

The other bits not used as index bits (here, the two bits b3 and b2 of the four-bit cache address) are used as the tag.

As such, the cache controller 120 can compute information on value distributions (i.e., a difference in the number of 1's and 0's) for bits of the cache addresses Cache Addr which are inputted for the predetermined number of times, and select the hash function to use the combination of the bits having the smallest absolute values for the value distributions as the index bits. Thus, the sets within the cache can be uniformly used.

Figure 5:
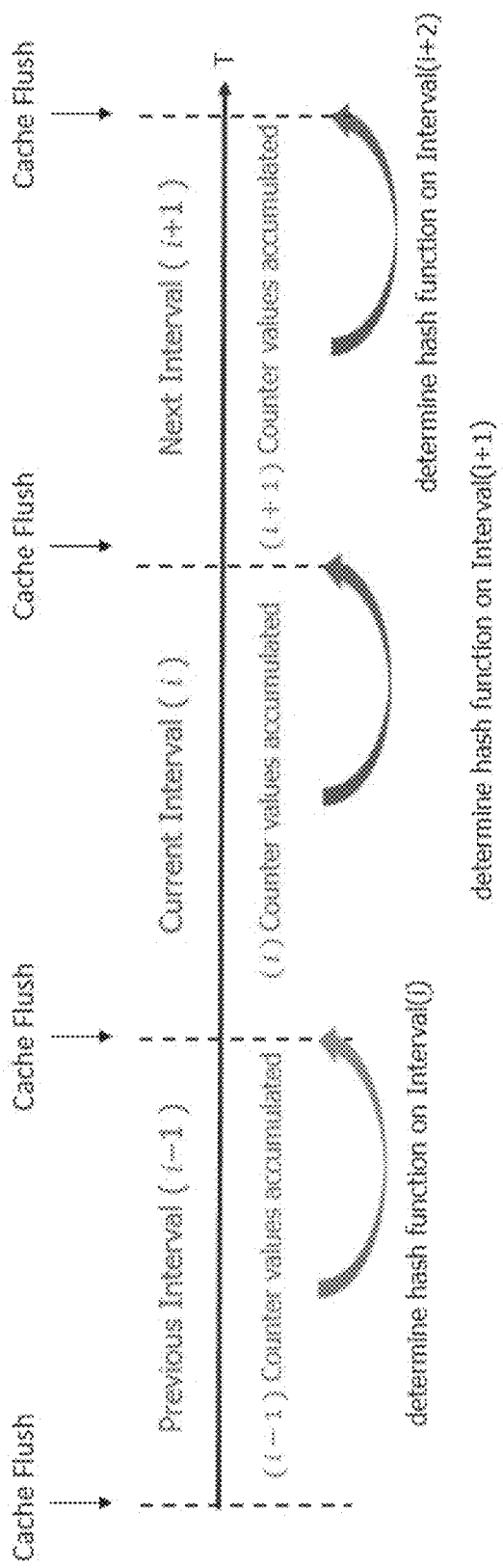
FIG. 5 illustrates a process in which the bit counters reset a hash function in accordance with an embodiment.

FIG. 5 is a diagram for describing a process in which the bit counters reset a hash function in accordance with the present embodiment.

In accordance with the present embodiment, the cache controller 120 resets a hash function each predetermined number of cache addresses using the four bit counters in the bit counter unit 121, and clears the cache 130 by flushing data within the cache 130 to the semiconductor device 150 at the moment when the cache controller 120 determines a new hash function to use specific address bits as the new index bits.

That is, when count values are accumulated in the bit counter unit during a previous interval Previous Interval(i−1), the cache controller 120 determines a new hash function to use in a current interval Current Interval(i) according to the values of the bit counters determined in the previous interval Previous Interval(i−1), and flushes the data within the cache 130 to the semiconductor device 150 before resuming operation using the new hash function.

Then, when the count values are accumulated in the bit counter unit during the current interval Current Interval(i), the cache controller 120 determines another new hash function to use in a next internal Next Interval(i+1), and flushes the data within the cache 130 to the semiconductor device 150 in the same manner.

The reason to flush the data of the cache to the semiconductor device each predetermined number of times is as follows. When a block of data is evicted from the cache, the semiconductor device address (Semi Addr) may be determined using the index and tag, and data of the cache corresponding to that index and tag may be written using the Semi Addr to the semiconductor device. In order to keep the Semi Addr matched to the cache address (Cache Addr), the current hash function must be taken into account when constructing the Semi Addr from the index and tag. For example, when bits b1 and b3 of the Cache Addr are used as index bits and bits b0 and b2 of the Cache Addr are used as tag bits, then bits b1 and b3 of the Semi Addr are determined using the index bits and bits b0 and b2 of the Semi Addr are determined using the tag bits.

When the hash function applied to the previous interval Previous Interval(i−1) and the hash function applied to the current interval Current Interval(i) are different from each other or the hash function applied to the current interval Current Interval(i) and the hash function applied to the next internal Next Interval(i+1) are different from each other, the cache address Cache Addr where predetermined data are stored may not coincide with the semiconductor device address Semi Addr from one interval to the next.

In order to solve such a problem, the data within the cache 130 need to be flushed to the semiconductor device 150 whenever each interval is started, such that the cache address Cache Addr and the semiconductor device address Semi Addr are matched with each other during each interval.

Figure 6:
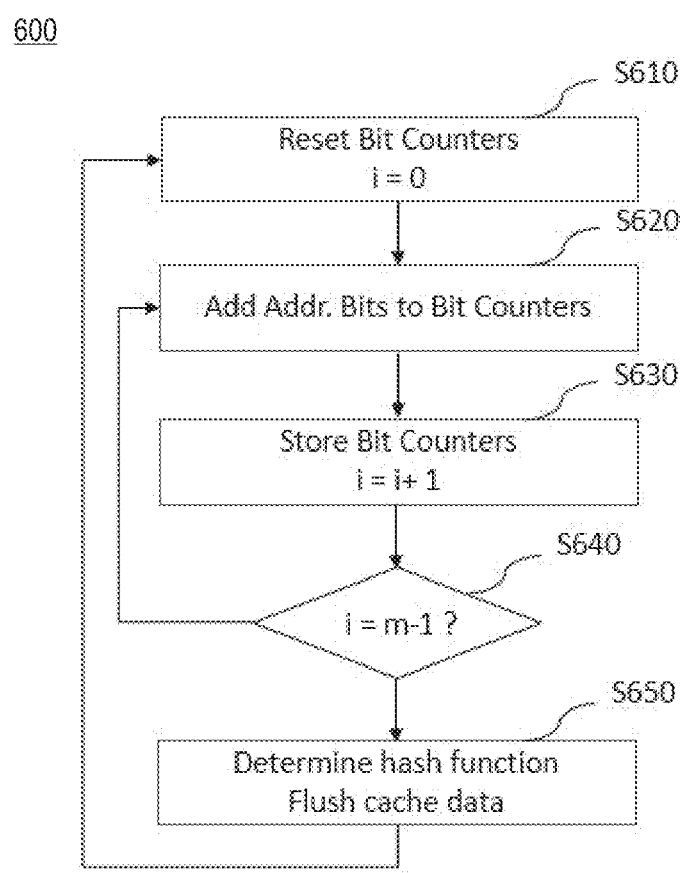
FIG. 6 is a flowchart illustrating a hash function resetting process in accordance with an embodiment.

FIG. 6 is a flowchart illustrating the hash function resetting process 600 in accordance with an embodiment.

In accordance with the present embodiment, the cache controller 120 resets the first to fourth bit counters BC0 to BC3 at step S610.

The cache controller 120 adds input address bits to the count values within the first to fourth bit counters BC0 to BC3 at step S620, and stores the added count values within the first to fourth bit counters BC0 to BC3 at step S630. In an embodiment, when adding an address bit to a counter, a bit value of '1' causes +1 to be added to the counter, and a bit value of '0' cause −1 (minus 1) to be added to the counter.

The cache controller 120 repeats steps S620 and S630 for a predetermined number m of times at step S640. In an embodiment, the predetermined number of times corresponds to a predetermined number of received address associated with read/write requests.

When it is determined at step S640 that steps S620 and S630 are repeated by the predetermined number m of times, the cache controller 620 determines a hash function to apply to the next interval, and flushes the data within the cache 130 to the semiconductor device 150, at step S650. Otherwise, the process 600 returns to step S620.

In accordance with the present embodiments, the computing system and method can determine index bits by hashing an address based on bit counters, and thus not only prevent a cache conflict miss caused by accesses concentrated on some sets such that the number of accesses to the semiconductor device can be reduced, but also prevent consecutive accesses to the same bank of the semiconductor device such that bank conflicts of the semiconductor device can be reduced.

Although various embodiments have been described for illustrative purposes, it will be apparent to those skilled in the art that various changes and modifications may be made without departing from the spirit and scope of the invention as defined in the following claims.

What is claimed is:

1. A computing system, comprising:
   a host device;
   a cache configured to temporarily store data of the host device, and comprising a plurality of sets;
   a cache controller configured to receive a multi-bit cache address from the host device, perform computations on the cache address using a plurality of bit counters, and determine a hash function of the cache using the results of the computations;

a semiconductor device; and a memory controller configured to receive the cache address from the cache controller, and map the cache address to a semiconductor device address.

2. The computing system of claim 1, wherein the cache controller generates respective computing values for the each bit of a plurality of bits of the cache address by adding a value corresponding to a value of the bit of the cache address to a respective bit counter of the plurality of bit counters for a predetermined number of cache addresses, generates absolute values for the respective bits by taking the absolute values of the computing values for the respective bits, determines the hash function of the cache to provide an address corresponding to a bit combination of the two or more smallest values among the absolute values for the respective bits as index bits of the cache, and selects any one of the plurality of sets through the hash function.

3. The computing system of claim 2, wherein each of the sets within the cache comprises a plurality of blocks each having a tag used to identify data stored in the block.

4. The computing system of claim 2, wherein the cache controller flushes the data within the cache to the semiconductor device using the hash function.

5. The computing system of claim 2, wherein the value added to the respective bit counter is a positive value when the bit of the cache address is "1", and is a negative value when the bit of the cache address is "0".

6. The computing system of claim 1, wherein the cache, the cache controller, the semiconductor device, and the memory controller are implemented as one module.

7. The computing system of claim 1, wherein the cache controller is coupled between the host device and the cache.

8. The computing system of claim 1, wherein the memory controller is coupled between the cache controller and the semiconductor device.

9. The computing system of claim 1, wherein the host device comprises any one of a host, a server, a storage controller of a storage area network (SAN), a work station, a personal computer, a handheld computer, a super computer, a computer cluster, a network switch, a router, a database, a data acquisition system, a diagnosis system, a test system, a robot, a portable electronic device, and a wireless device.

10. The computing system of claim 9, wherein the cache controller is coupled between the host device and the cache.

* * * * *